US007896368B2

(12) United States Patent
Craig et al.

(10) Patent No.: US 7,896,368 B2
(45) **Date of Patent: *Mar. 1, 2011**

(54) DOLLY FRAME GENERATOR

(75) Inventors: Scott Craig, Jackson, TN (US); P. Brent Boyd, Jackson, TN (US)

(73) Assignee: Black & Decker Inc., Newark, DE (US)

(*) Notice: Subject to any disclaimer, the term of this patent is extended or adjusted under 35 U.S.C. 154(b) by 140 days.

This patent is subject to a terminal disclaimer.

(21) Appl. No.: 12/315,334

(22) Filed: Dec. 2, 2008

(65) Prior Publication Data

US 2009/0079151 A1 Mar. 26, 2009

Related U.S. Application Data

(63) Continuation of application No. 10/418,178, filed on Apr. 17, 2003, now Pat. No. 7,475,888.

(60) Provisional application No. 60/373,427, filed on Apr. 18, 2002, provisional application No. 60/453,838, filed on Mar. 11, 2003.

(51) Int. Cl.
*B62B 1/12* (2006.01)

(52) U.S. Cl. ................ 280/47.24; 280/47.17; 280/47.2; 280/47.315; 280/47.131; 280/47.33

(58) Field of Classification Search ............ 280/47.131, 280/47.315, 47.17–47.18, 47.2, 47.24, 655.1, 280/79.11, 79.4, 79.5; 417/234; D13/112, D13/116; D34/24
See application file for complete search history.

(56) References Cited

U.S. PATENT DOCUMENTS 7,475,888 B2 * 1/2009 Craig et al. .............. 280/47.18

* cited by examiner

*Primary Examiner*—J. Allen Shriver, II
*Assistant Examiner*—Vaughn T Coolman
(74) *Attorney, Agent, or Firm*—Rhonda L. Barton; Michael P. Leary; Adan Ayala

(57) ABSTRACT

The present invention is directed to a generally L-shaped frame assembly or dolly for mechanical devices, such as generators. The assembly includes a first and second frame portions. The first frame portion includes intermediate segments which are substantially equal or greater than the length of the mechanical device so as to protect the device and provide a lifting point for hoisting.

8 Claims, 6 Drawing Sheets

DOLLY FRAME GENERATOR

CROSS REFERENCE

The present application is a continuation of U.S. patent application Ser. No. 10/418,178, filed Apr. 17, 2003 now U.S. Pat. No. 7,475,888, entitled “Dolly Frame Generator”, that claims priority under 35 U.S.C. §119(e) to U.S. Provisional Patent Ser. No. 60/373,427, entitled: Dolly Frame Generator, filed on Apr. 18, 2002, and U.S. Provisional Patent Ser. No. 60/453,838, entitled: Portable Generator Dolly, filed on Mar. 11, 2003 all of which are hereby incorporated by reference in their entirety.

FIELD OF THE INVENTION

The present invention relates to the field of portable mechanical devices and particularly to an apparatus for transporting portable internal combustion device.

BACKGROUND OF THE INVENTION

Portable devices, an in particular internal-combustion devices, allow users to implement a wide variety of time saving capabilities. Often times the location of the project necessitates transporting a device to the project area. For example, construction sites often are a significant distance from the nearest access point such as road. Furthermore, such devices are often transported in motor vehicles between job-sites.

Previously, when transporting a generator, for instance, two workers would support a generally open rectangular tubular frame between themselves. Typically, the weight of the device in combination with the distance to the worksite prevents solo transport. Therefore, two people hand-carrying the device will have to walk in tandem, sometimes over rough, or muddy terrain, with the device carried between themselves. Hand transport is difficult and may result in the device being accidentally dropped or the users having to set the device down to take a “break”.

While the user may extend the range of the device, such as by utilizing a long extension cord, in the case of a generator, or a utilizing a long hose, in the case of a power washer, the usefulness of a portable device may be off-set by the need to carry additional attachments.

Further, hoisting and transporting portable devices like generators, compressors, and power washers, into motor vehicles may be problematic. For example, often portable devices are transported in pick-up trucks, or in work-vans which have a high bed and/or a low compartment interior. Previous devices may not offer the ability to easily hoist the device while offering protection for mechanical components.

Therefore, it would be desirable to provide an apparatus for easy hand transport and hoisting.

SUMMARY OF THE INVENTION

Accordingly, the present invention is directed to an apparatus including mechanical device, and an L-shaped frame assembly including a pair of spaced apart wheels for rolling transport. The frame assembly at least partially encloses the mechanical device to prevent damage to the mechanical device and provide a lifting point for hoisting. In an exemplary embodiments the first and second frame portions are connected at a position equal to the height of the mechanical device.

In another aspect of the invention, the apparatus includes a generator with an internal combustion and an alternator. The alternator being directed generally towards the spaced apart wheel members and the connection between the first and second frame portions, so as to minimize the force required to tilt the apparatus for rolling transport.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
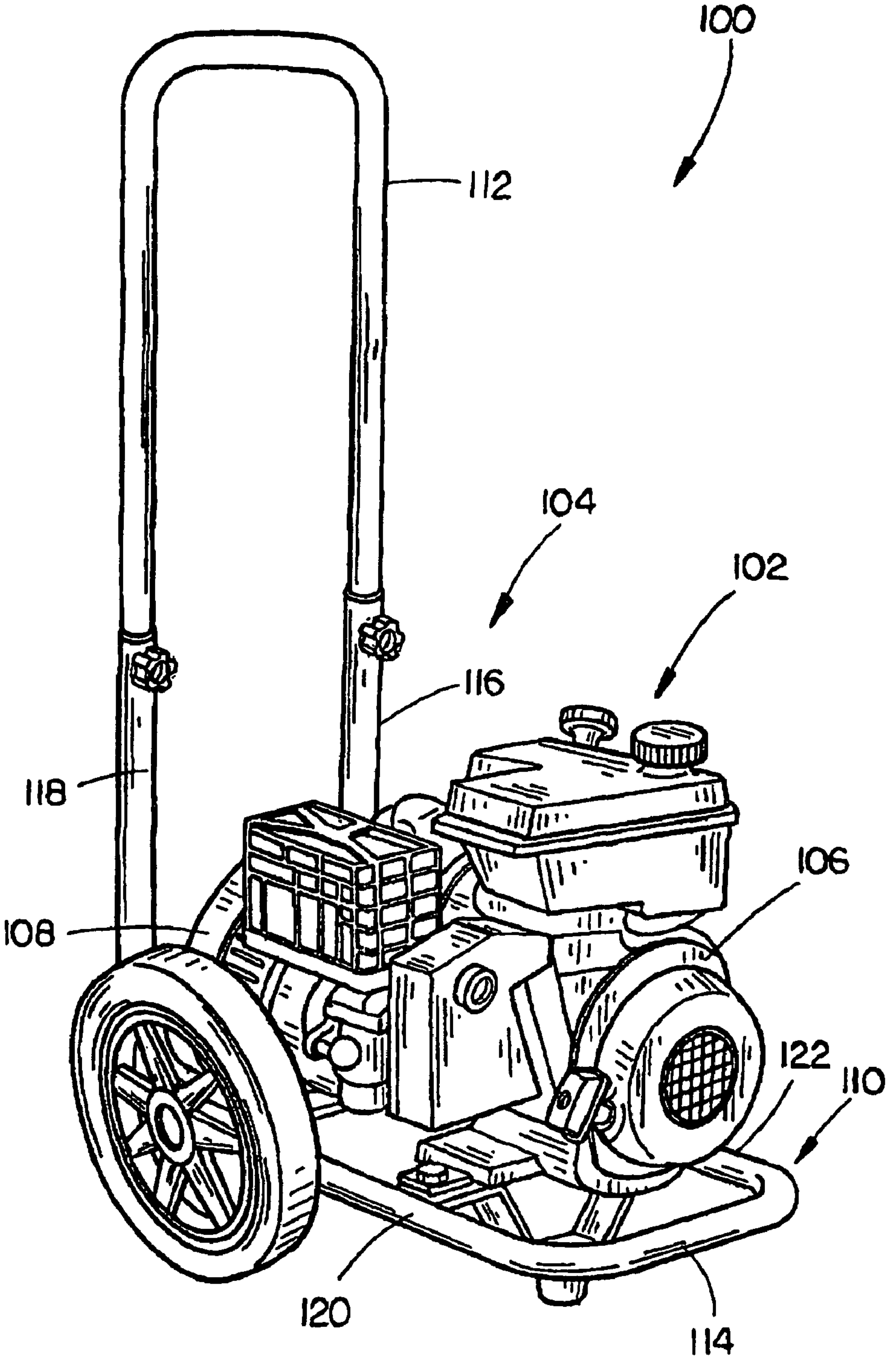
FIG. 1 is an isometric view of a generator integrated with an L-shaped frame assembly of the present invention.

Referring to FIG. 1, a portable apparatus is discussed. In accordance with an exemplary embodiment, a portable apparatus 100 is a generator 102 and a L-shaped frame assembly 104, or dolly. The generator includes an internal combustion engine 106 for creating mechanical energy and an alternator 108, coupled to the engine, for converting mechanical energy into electrical energy. In further embodiments, the mechanical device 100 is a compressor, a power washer, a pump and the like for conducting a task, such as delivering a high pressure stream of water, delivering a stream of compressed air and the like. As will be apparent, various devices may benefit from employing the dolly of the present invention without departing from the spirit and scope of the present invention. It is the intention of the present disclosure to encompass and include such variation.

The frame assembly 104 is substantially L-shaped when viewed in profile. The frame includes a first, or base, portion 110 and second, or upper, frame portion, 112. The frame portions are particularly suited to efficient manufacturing while providing the user an effective transport and hoisting system. Preferably, the first and second frame portions may be formed of generally metallic cylindrical tubing, such as steel tubing. In further instances, the shape and the composition of the frame sections may be varied as desired. For instance, the second frame portion may be formed from oval shaped tubing, for user comfort while manually transporting the apparatus.

The first frame portion 110 is substantially U-shaped with the connecting segment 114 being formed as a straight side. Preferably, the terminal portions of the first frame portion are angled to be generally perpendicular to a plane encompassing the main body of the first frame. For instance, the first frame portion includes terminal segments 116 and 118 which are of a length approximately the height of the mechanical device, for which the frame is designed, or greater. Extending the distal portions of the U-shape perpendicular and equal to the height of the device creates a partial cage for protecting the device. For example, the frame may protect the mechanical device from contacting the side of a pick-up truck compartment, or from contacting other objects in the compartment. In further examples, the terminal portions of the first frame are extended at other angles, such as to promote comfort during manual transport, to promote an increase in rolling clearance, and the like.

Figure 4:
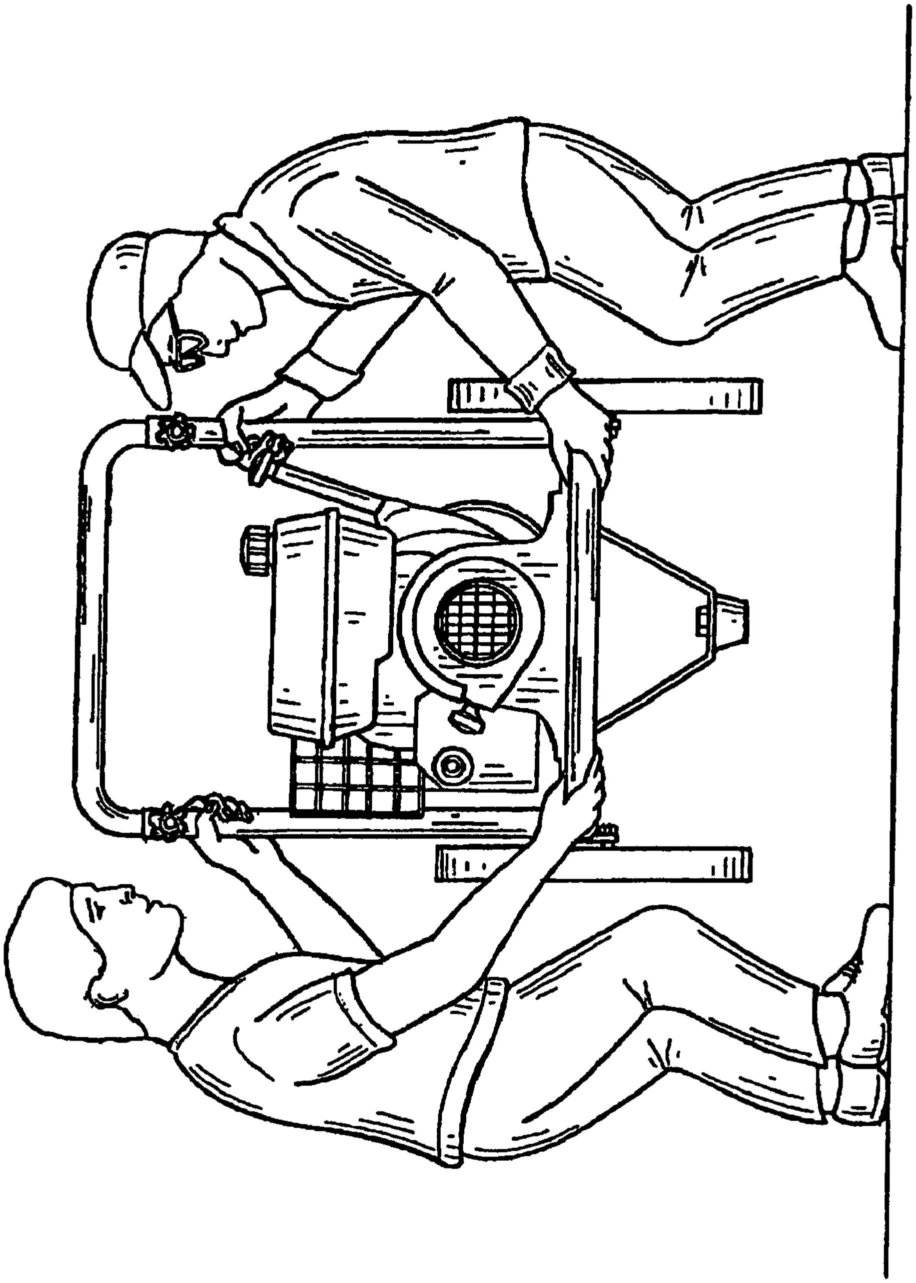
FIG. 4 is an illustration of two people hoisting a generator and frame assembly via a connecting segment of a first frame portion.

The intermediate segments 120 and 122 of the first frame portion 110 between the connecting segment and any angled terminal segments are of a length substantially equal to, or greater than the length of the mechanical device for which the frame is intended. Dimensioning the first frame member in this fashion allows the connecting portion of the first frame to form a lift point for hoisting the apparatus. For example, a user may grasp the end or connecting segment 114 of the U-shape to lift the apparatus into a vehicle. See generally FIG. 4. Furthermore, the connecting segment 114 allows the user to readily grasp the frame without having to tilt the apparatus, or change grasping positions, such as from a upper frame to a lower frame, both of which may be required with previous caged framed generators. Those of skill in the art will appreciate that the connecting segment 114 may act to protect the device, such as from contact which may damage a device housing or the operative components of the device.

A second frame portion 112 is removably connected to the first frame portion 110. In the present embodiment, the second frame portion is substantially U-shaped extending in a general plane. In additional embodiments, the second frame may include an angled section extending in a second plane, so as to promote easy rolling transport of the apparatus over terrain, increase rolling transport clearance and the like. Additionally, the connecting segment of the second frame member, the cross member forming the U-shape, may be coated with an elastomeric material or enclosed in a sleeve of elastomeric material to improve griping, minimize user muscle fatigue, dampen vibration and the like.

Figure 2:
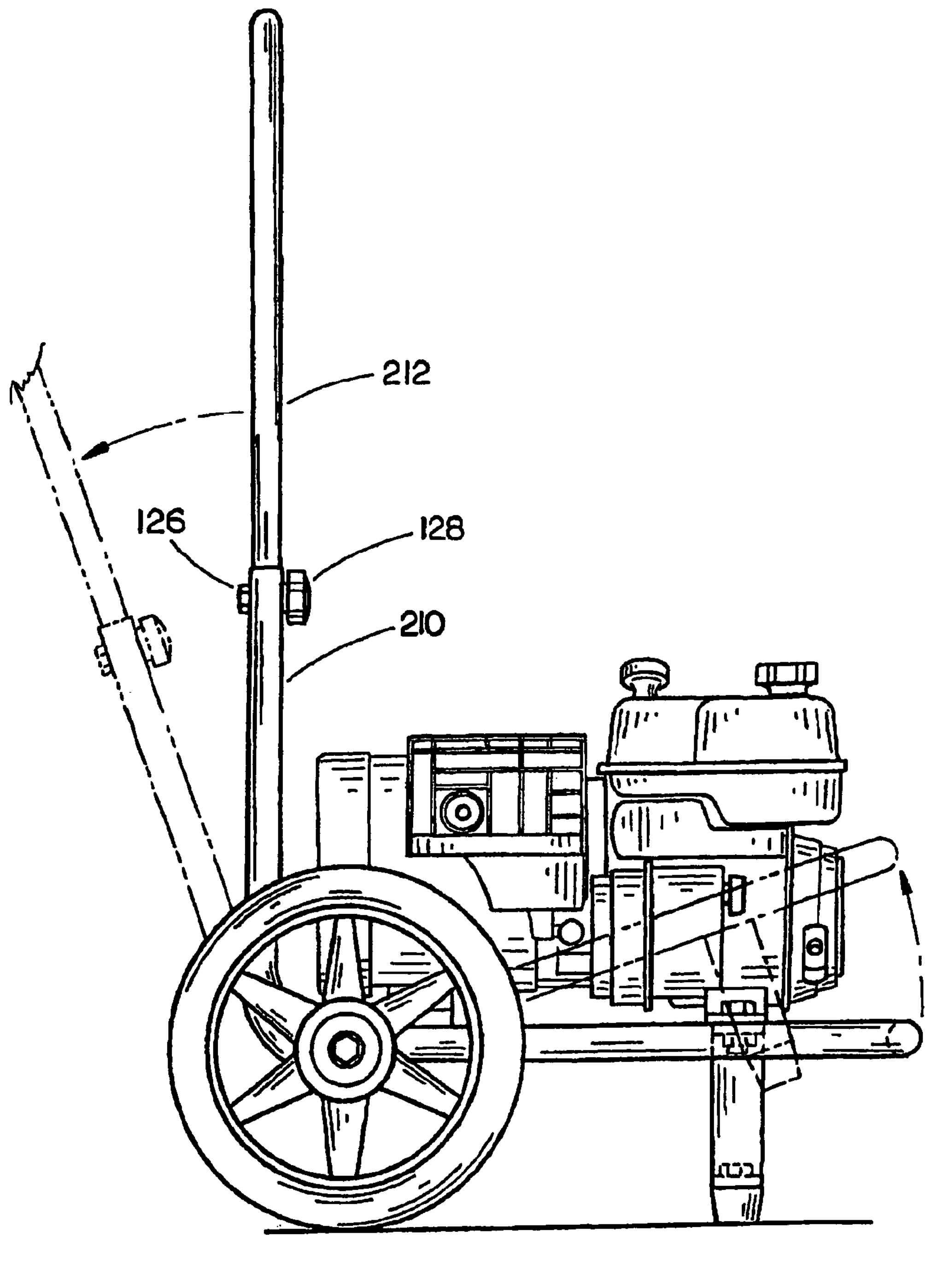
FIG. 2 is a side view of a generator and a frame assembly indicating tilting of the apparatus for rolling transport.

A securing device connects a terminating segment of the first frame portion to a corresponding terminating segment of the second frame portion. Referring to FIG. 2, in the current example, the securing device is a through bolt 226 and a threaded hand grip knob 228. Other suitable securing devices include fasteners, bolts and butterfly nuts, a linchpin, a hair pin and through pin combination, bayonet locks, set bolts, spring biased pins, clamp locks, and the like for permitting releasable securing of the frame portions. In a first embodiment, at least one of the terminal segment of the first and second frame portion 210 and 224 is slideably received into a correspond segment of the other frame with a bolt, extending through aligned apertures in the segments, and nut securing the bolt. In another example, as may be seen generally in FIG. 5 a plurality of apertures in the terminal segments of at least one frame portion to allow the user to semi-customize, or telescope the height of the second frame portion 512 forming a handle. The second frame 512 portion may, additionally be implemented to protect the mechanical device when in a retracted or stowed position.

Figure 6:
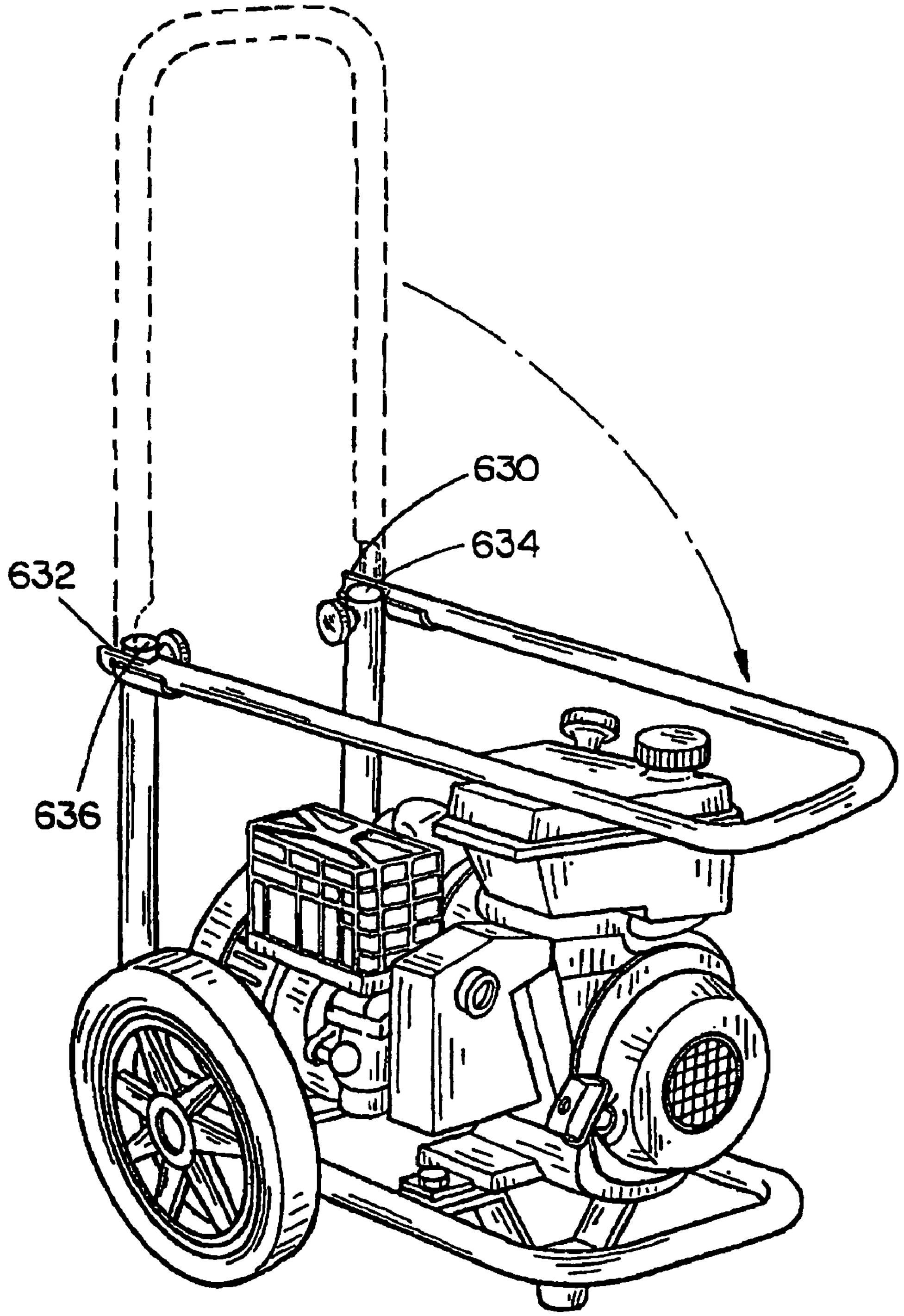
FIG. 6 is an isometric view of a frame assembly including a second frame portion disposed in a folded/stowed orientation.

Referring now to FIG. 6, in a further aspect at least one of the terminal portion of the first and second frame portions 630 and 632 include substantially C-shaped cross-section, so a to permit close contact between the corresponding ends when secured. For example, the ends of the second frame portion 630 and 632 are C-shaped so as to fit securely partially around the outside surface of the corresponding circular-cross section of the first frame ends 634 and 636. In additional examples, the C-shaped end includes a coved out recess extending generally perpendicular to the C-shaped cross section, adjacent the securing device, to increase the contact between the ends when the second frame portion is "folded over" such as when in a stowed position. Further, in either of the previous examples, a folded, or stowed position further protects the mechanical device by forming a top cage portion around the device. As will be apparent, it may be preferably for the second frame portion, from the connection point to the connecting segment to be of a length of approximately equal to the length of the mechanical device, thus protecting the substantial entirety of the mechanical device.

Figure 3:
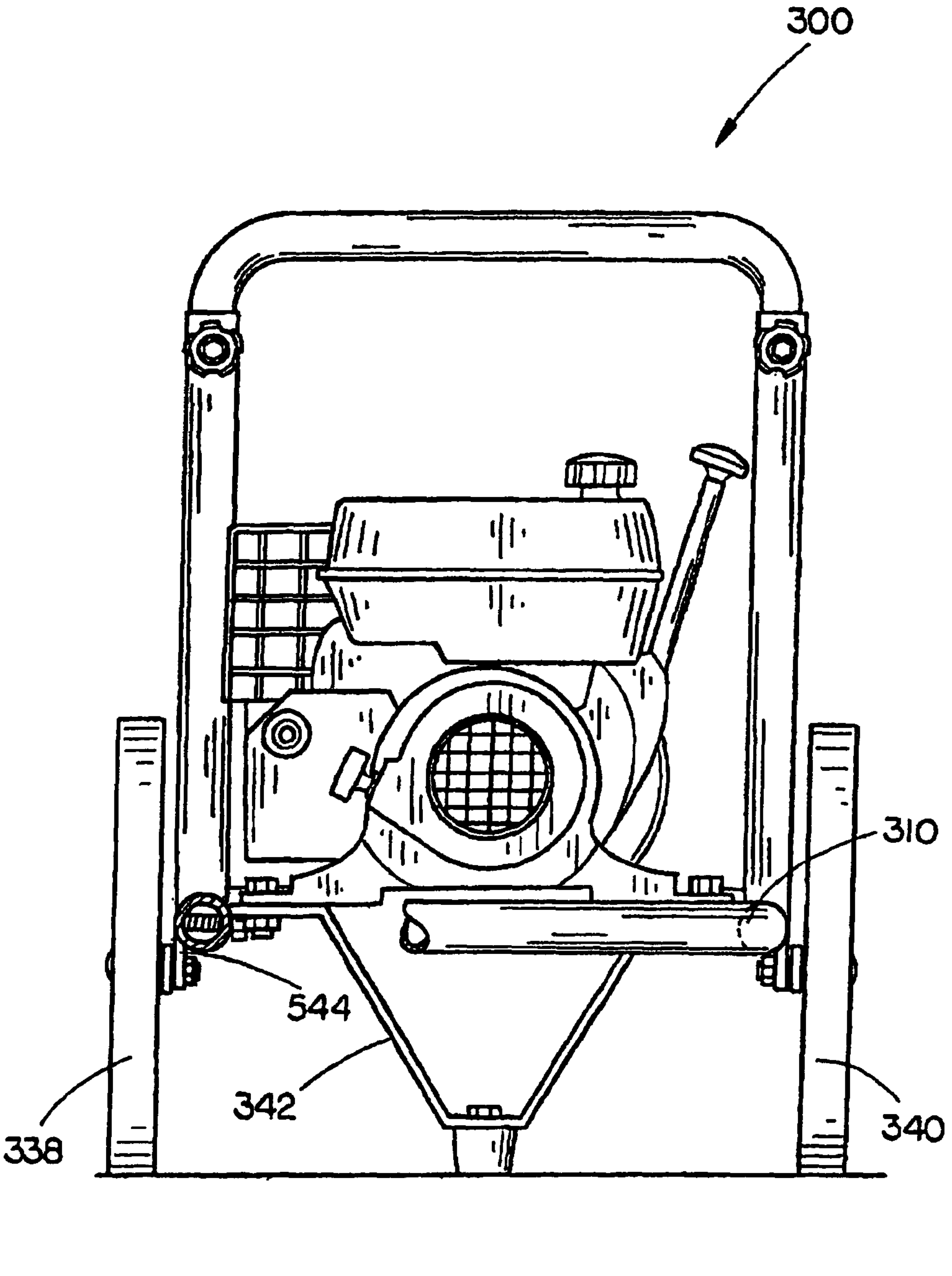
FIG. 3 is a front cut away view of an frame assembly, including a pair of spaced apart wheels mounted to a generator bracket wherein in the second frame portion is disposed in a retracted position.
Figure 5:
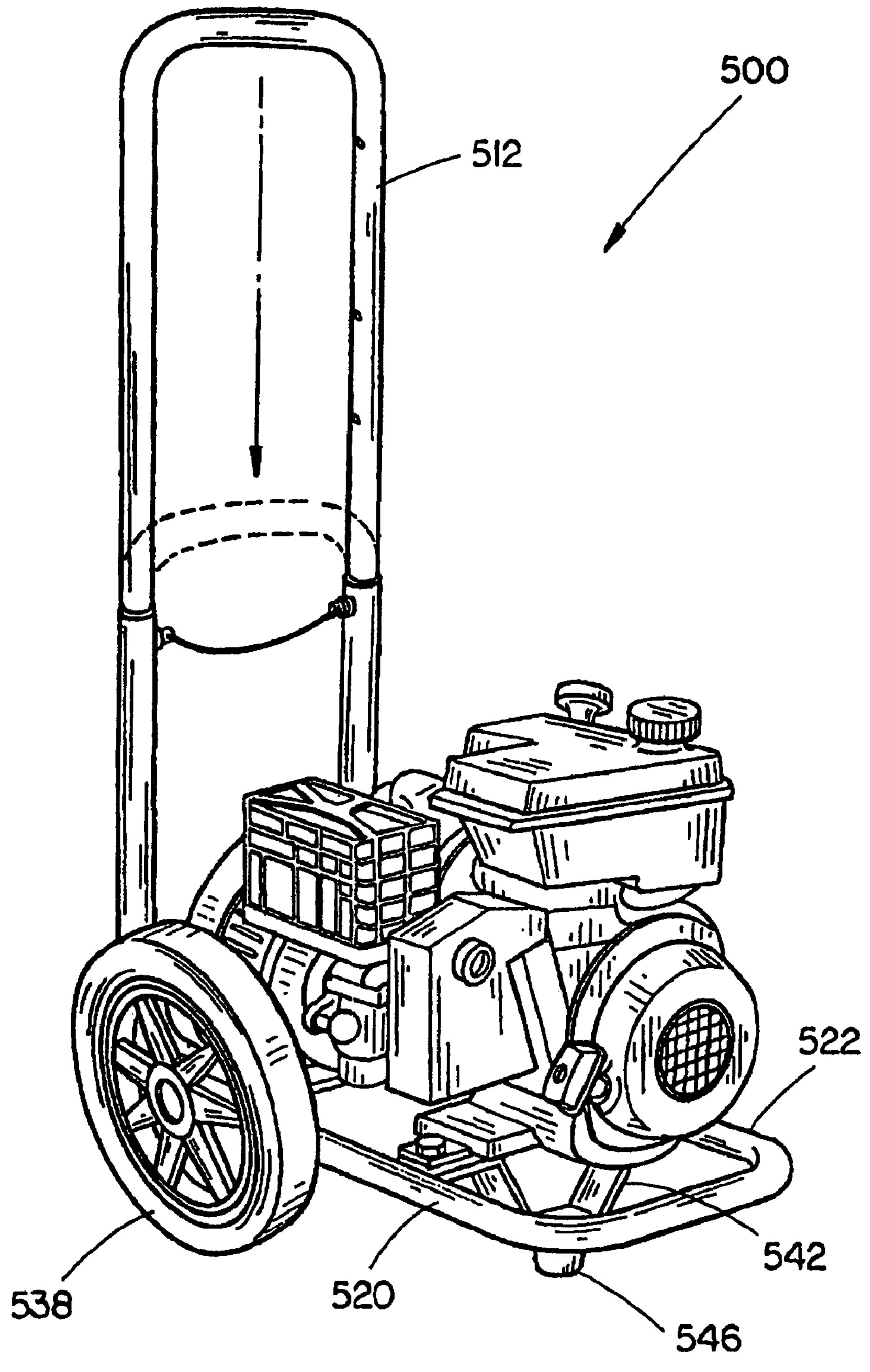
FIG. 5 is an isometric view of a generator and L-shaped frame assembly wherein the frame assembly includes a telescoping second frame portion and biased securing pins.

Referring to FIGS. 3 and 5, an apparatus 300, 500 of the present invention further includes a pair of spaced-apart wheels 338 and 340 mounted to the first frame member 310. As will be apparent, the wheels may be additionally or solely attached to a bracket supporting the mechanical device, adjacent the first frame portion. For instance, the wheels are mounted to an angled portion of a generator bracket 544.

As may be best seen in FIG. 5, the wheels (one is shown 538) may be of a radius approximately equal to the height of a foot member 542. Including wheels with a radius of the foot member allows an included mechanical device to be considerably level, when disposed on a level surface. Inclusion of a foot member 542, such as is connected at or approximately adjacent the length of the mechanical device permits tripod type support when the apparatus is rested, thus minimizing tipping. Referring to FIG. 3, the tripod being formed between the foot member 342 and the wheels 338 and 340.

For ease of manufacture, and rigidity, the foot member 542 may be an angular bracket connected to the intermediate segments 520 and 522 of the first frame portion, such as by a fastener, such as a bolt, a weld or the like. In further examples the foot member includes tabbed portions for securing to the first frame portion. A level mechanical device may experience significantly less mechanical wear, over a non-level device, because of to proper balancing, thorough lubrication and the like.

Preferably, the wheel are of a sufficient radius to permit easy rolling transport over obstacles typically found on jobsites, such as tire and bulldozer ruts, scraps of building materials such as dimensional lumber (2×4s) and the like, although wheels of various sizes are contemplated. In the present embodiment the wheels are formed of plastic to avoid air loss associated with pneumatic tires. In additional embodiments, the wheels are pneumatic tires so as to spread out the weight of the apparatus, dampen vibration and the like. Referring to FIG. 2, the apparatus of the present invention allows the user to tilt the frame assembly (with respect to the wheels) to optimize clearance when the apparatus is rolled over a terrain. If the mechanical device has an unequal weight distribution it is preferable for a heavier end of the device to be orientated towards the wheels/the intersection of the legs of the L-shape. For example, the alternator end of a generator is disposed adjacent to the wheels to minimize the force necessary to tilt the apparatus for transport, this, is due to the respective weight of the motor/alternator. In a further example, the mechanical device and the first frame portion extend over the wheels so as to shift the apparatus' center of mass closer to the pivot axis extending through the wheels.

Referring to FIG. 5, in additional exemplary embodiments, vibration dampening devices are employed such as between the device and the first frame portion, between the foot member and the first frame portion and the like. Preferably, vibration dampening devices are elastomeric pads 546 or disks with a bolt penetrating therethrough. Further, the bolts may be implemented to connect the various components.

It is believed that the apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A portable dolly frame generator, comprising:

a mechanical device including:

an internal combustion engine for generating mechanical energy; and an alternator coupled to the engine and configured to convert mechanical energy into electrical energy; and a generally L-shaped frame assembly including:

a first frame portion connected to at least one of the engine and the alternator, wherein the first frame portion comprises:

a substantially U-shaped member including a connecting segment, the connecting segment providing a lift point for hoisting the dolly frame generator, and wherein parallel segments of the U-shaped member are of a length that is at least substantially equal to a length of the mechanical device; and a pair of terminal segments disposed at an angle greater than zero degrees with respect to the U-shaped member, wherein the pair of terminal segments include at least one generally C-shaped cross-sectional end for securing to at least one corresponding generally circular cross-sectional end of a second frame portion;

a pair of spaced apart wheel members, mounted to the first frame member, for rolling transport over a surface;

a foot member connected to the first frame portion at approximately the length of the mechanical device away from the wheel members, the foot member extending generally away from the mechanical device, for supporting the apparatus with the wheels, when the apparatus is rested on a surface;

wherein the second frame portion comprises a substantially U-shaped frame portion removably connected to the terminal segments of the first frame portion adjacent the wheel members, the second frame portion for manipulating the apparatus during transport; and means for adjustably securing the first frame portion to the second frame portion.

2. The apparatus of claim 1, further comprising at least one vibration dampening device mounted between at least one of the mechanical device and the first frame portion and between the first frame portion and the foot member.

3. The apparatus of claim 1, wherein the vibration dampening device is an elastomeric pad.

4. The apparatus of claim 1, wherein the first frame portion and the second frame portion are connected at a position substantially equal to or greater than the height of the mechanical device.

5. The apparatus of claim 4, wherein the second frame portion is manipulateable to achieve a deployed position and a hoisting position, wherein the connecting terminal segments of the first frame portion are of a height that is substantially equal to the height of the mechanical device.

6. The apparatus of claim 1, wherein the first frame portion and the second frame portion are formed of tubing.

7. The apparatus of claim 1, wherein the second frame portion is-manipulateable to achieve a folded position for protecting the mechanical device.

8. The apparatus of claim 1, wherein the securing means comprises at least one of a threaded bolt, a threaded knob, a bayonet lock, a spring biased pin and a clamp lock.

* * * * *